(12) United States Patent
Petty (10) Patent No.: US 9,186,625 B2
(45) Date of Patent: Nov. 17, 2015

(54) METHOD AND APPARATUS FOR PRE-HEATING RECIRCULATED FLUE GAS TO A DRY SCRUBBER DURING PERIODS OF LOW TEMPERATURE

(71) Applicant: Paul E Petty, Eldersburg, MD (US)

(72) Inventor: Paul E Petty, Eldersburg, MD (US)

(73) Assignee: Andritz, Inc., Alpharetta, GA (US)

(*) Notice: Subject to any disclaimer, the term of this patent is extended or adjusted under 35 U.S.C. 154(b) by 317 days.

(21) Appl. No.: 14/016,669

(22) Filed: Sep. 3, 2013

(65) Prior Publication Data

US 2014/0086797 A1 Mar. 27, 2014

Related U.S. Application Data

(60) Provisional application No. 61/704,073, filed on Sep. 21, 2012.

(51) Int. Cl.
*B01D 53/34* (2006.01)
*B01D 53/40* (2006.01)
*B01D 53/50* (2006.01)
*B01D 53/83* (2006.01)

(52) U.S. Cl.
CPC ............. *B01D 53/346* (2013.01); *B01D 53/40* (2013.01); *B01D 53/508* (2013.01); *B01D 53/83* (2013.01)

(58) Field of Classification Search
CPC .... B01D 53/346; B01D 53/40; B01D 53/508; B01D 53/83
See application file for complete search history.

(56) References Cited

U.S. PATENT DOCUMENTS

| | | | |
|---|---|---|---|
| 3,862,295 A * | 1/1975 | Tolles ................... | B01D 53/12 423/244.03 |
| 4,129,250 A * | 12/1978 | Chaikin ................. | G05D 22/02 236/44 A |
| 4,310,498 A * | 1/1982 | Malki ................... | B01D 53/501 423/243.01 |
| 4,610,849 A * | 9/1986 | Van Camp ........... | B01D 53/501 261/23.1 |
| 4,621,069 A * | 11/1986 | Ganguli ................ | B01J 21/20 208/176 |
| 4,809,537 A * | 3/1989 | Glover .................. | G01K 13/02 137/253 |
| 4,836,991 A * | 6/1989 | Ishiguro ............... | B01D 53/501 423/166 |
| 4,890,479 A * | 1/1990 | Glover .................. | G01N 25/64 236/44 A |
| 5,006,322 A * | 4/1991 | Schuetzenduebel ... | B01D 53/40 110/215 |

(Continued)

*Primary Examiner* — Christopher P Jones (74) *Attorney, Agent, or Firm* — Ober, Kalerm Grimes & Shriver; Royal W. Craig (57) ABSTRACT

A method and system for preventing exclusions in an air quality control system (AQCS) of a type having a scrubber, either a circulating fluidized bed (CFB), transport reactor (TR) or spray-dryer absorber SDA, and in all three cases with a flue gas recirculation FGR system. The invention automatically pre-heats flue gas recirculated to the input of the CFB/TR/SDA scrubber during periods of low temperature operation. The system supplements the "traditional" gas recirculation scheme with heater(s) that are used during periods of low temperature. During periods of low load conditions, the system monitors the SDA/TR/CFB inlet temperature and, when it falls below a setpoint, the control system increases the heat input of the pre-heater(s) in the FGR system in order to maintain a minimum inlet temperature. This satisfies the need for the inlet temperature to be above a certain level, thereby ensuring that the temperature is high enough so that when process water is added for promotion of the acid gas reactions with lime the scrubber exit temperature is maintained above the minimum required for proper system operation. The temperature sensor may be a conventional dry bulb temperature sensor or its functional equivalent installed at or near the CFB, TR or SDA scrubber FGR inlet.

30 Claims, 3 Drawing Sheets

(56) References Cited

U.S. PATENT DOCUMENTS

| | | | | |
|---|---|---|---|---|
| 5,460,041 A * | 10/1995 | Andes | G01N 25/64 374/148 |
| 5,669,317 A * | 9/1997 | May | C10B 1/10 110/229 |
| 5,756,058 A * | 5/1998 | Watanabe | B01D 53/1406 423/237 |
| 5,791,268 A * | 8/1998 | Battles | B01D 53/8609 110/215 |
| 5,943,865 A * | 8/1999 | Cohen | B01D 53/8631 110/345 |
| 6,152,053 A * | 11/2000 | Czarnecki | F23J 15/04 110/190 |
| 7,125,007 B2 * | 10/2006 | Wulteputte | B05B 7/2489 261/115 |
| 2006/0239881 A1 * | 10/2006 | Nagayasu | B01D 53/75 423/240 R |
| 2010/0147146 A1 * | 6/2010 | Petty | B01D 53/12 95/16 |

\* cited by examiner

METHOD AND APPARATUS FOR PRE-HEATING RECIRCULATED FLUE GAS TO A DRY SCRUBBER DURING PERIODS OF LOW TEMPERATURE

CROSS-REFERENCE TO RELATED APPLICATION(S)

The present application derives priority from U.S. Provisional Patent Application No. 61/704,073 filed 21 Sep. 2012.

BACKGROUND OF THE INVENTION

1. Field of the Invention

The present invention relates to a method and system for increasing the operational range and efficiency of an Air Quality Control Systems (AQCS) incorporating both a Circulating Fluid Bed Scrubber (CFB) with flue gas recirculation (FGR) system by automatically pre-heating flue gas recirculated to the input of the CFB dry scrubber during start-up, shut-down and other periods of low temperature operation. The invention is also effective for Spray Dry Absorbers (SDAs) and Transport Reactor (TR) type dry scrubbers.

2. Description of the Background

Power companies' efforts to reduce sulfur dioxide and other emissions have focused largely on the use of advanced emission control equipment and improving operating practices. A number of different Air Quality Control Systems (AQCS) have evolved for flue gas cleaning and desulfurization including Baghouses, Dry Scrubbers and selective catalytic reduction (SCR) devices. In most dry scrubbers, lime and water are sprayed into the gases. The lime and sulfur react to capture the sulfur, producing a waste byproduct. These scrubbers can reduce sulfur dioxide emissions by more than 95 percent. However, the flue gas coming from the upstream boiler is very hot. For proper operation of the dry scrubber, the gas must be cooled to near its adiabatic saturation temperature so that the gas holds as much water vapor as it can, without overcooling which can also cause adverse effects. Scrubbers control the flue gas temperature by varying their water injection rate. More water cools the flue gas more, and vice versa. This results in an operational balance or equilibrium that is maintained.

There are various types of dry scrubbers, including spray dryer absorber (SDA) systems in which flue gas is contacted with an aqueous lime slurry that is sprayed onto the flue gas. Contact with the aqueous slurry cools the flue gas to near the adiabatic saturation temperature and the $SO_2$ is removed from the flue gas. In contrast, circulating fluidized bed (CFB) systems use a dry powdered hydrated lime reagent, in addition to coal ash and other solids, to create a "fluidized bed" within the scrubber vessel. Water is direct-injected into the scrubber bed to cool and humidify it, but is not mixed with the lime in a slurry. Instead, the water wets the lime, and the water injection is controlled so that the lime dries completely in the scrubber vessel and downstream ductwork. In the case of a Transport Reactor the lime may be injected either dry or as a slurry. A Transport Reactor (TR) is differentiated from the SDA and CFB technologies mainly by the very high reactor vessel velocity and use of either a thin bed of lime, ash and byproduct or no bed of material in vessel. Additionally, some dry lime injection type TR designs differ from SDA and CFB technologies by injecting water directly into the recycled solids in a mill that is external to the flue gas stream. For the SDA, TR and CFB the by-products are dry.

For all three types of dry scrubber, whether SDA, TR or CFB, maintaining the proper operational balance or equilibrium is easier when the power plant is operating at normal capacity because the flue gas flow rate can support the operation of the pollution control equipment. For all three types of dry scrubber, whether SDA, TR or CFB, multiple parallel trains of scrubber vessel and associated particulate collector may be employed. However, flue gas flow rate can sometimes become a problem during start-up, shut-down and other low load conditions. Below certain minimum operational levels, poor acid gas removal efficiency is a direct result of low load operation, and low load operation is inevitable during unit startups and shutdowns, or during power plant cycling.

With the advent of new air pollution control regulations that do not permit any periods of non-compliance, even during boiler start-up and shutdown, taking the AQC System offline at low load is no longer an option. Any excursion of high acid gas emissions rates can result in the plant owner being in violation of laws punishable by fines and worse if the plant is a chronic offender. This has driven pollution control system manufacturers to add Flue Gas Recirculation FGR systems to their equipment in order to maintain the flow through the AQC System above the minimum operating velocity during all boiler load conditions. An FGR system recirculates a portion of the treated flue gas back into the inlet of the pollution control equipment, thereby increasing its volumetric throughput to a level at or above the minimum required to operate the equipment. The FGR system typically consists of a duct connecting the discharge side of the ID Fan with the inlet duct of the scrubber or other AQC Equipment, a control damper in that duct to regulate the amount of gas that is recirculated and flow measuring devices to allow the control system to determine the amount of gas being recirculated and the total amount of gas flowing through the AQC system. Although an FGR addresses flow rate, both a minimum flow rate and temperature are required in order to put a dry scrubber into service. If the flue gas temperature entering the SDA, TR or CFB is too low, insufficient water or lime slurry injection occurs, resulting in poor acid gas removal efficiency. Use of traditional FGR makes this issue worse as the cleaned flue gas used for gas recirculation is much cooler than the gases entering the scrubber system from the boiler or other source and, by itself, is much cooler than is allowable for proper scrubber operation.

Even with an FGR system it is possible to experience "excursion" issues, e.g., acid gas emissions leaving the scrubber system at values much higher than the allowable levels. For example, for any type of dry scrubber, SDA, TR or CFB, if one introduces flue gas into the reaction chamber prior to the time that they introduce the water and/or lime or other sorbent, there is nothing to clean the flue gas and SO2 and other acid gaseous emissions leave the scrubber system at values much higher than the allowable levels. Thus, for any traditional FGR system it is not possible for a dry scrubber of any type to receive flue gas from the boiler or other source and to scrub it as required without an excursion unless the scrubber has first been brought up to minimum flow and temperature, and lime and water have been added to the system.

It would be far more advantageous to devise a pre-heating system for dry scrubbers that employ FGR systems in order to maintain a minimum inlet temperature. This would satisfy the need for the inlet temperature to be above a certain level, thereby ensuring that the temperature is high enough so that when process water is added for promotion of the acid gas reactions with lime the scrubber exit temperature is maintained above the minimum required for proper system operation. Such a pre-heating system would ensure that no acid gas excursions occur even for applications where the flue gas temperature is insufficient for proper CFB, TR or SDA operation. Moreover, if used in conjunction with scrubber system inlet and outlet isolation dampers, such a system could be used to place a dry scrubber into operation even before the flue gas is introduced into the system (in the complete absence of flue gas).

SUMMARY OF THE INVENTION

The present invention is a method and system for increasing the efficiency of a dry scrubber, and especially a circulating fluidized bed scrubber (CFB) having a flue gas recirculation system (FGR). However, the invention is also effective for spray-dryer absorbers (SDAs) and Transport Reactor (TR) type dry scrubbers, and alternate embodiments are herein described. The invention comprises a control system and feedback loop, and one or more preheaters incorporated in the CFB FGR system for automatically pre-heating flue gas recirculated to the input of the dry scrubber during periods of low inlet temperature operation. The system supplements the "traditional" gas recirculation scheme with heater(s) that are used during periods of low inlet temperature. The heaters may be electric, steam or natural gas fired, and are automatically activated and controlled in accordance with the scrubber inlet temperature signal. For this, the system employs one or more robust temperature sensors at or near the CFB scrubber FGR inlet. The temperature sensor is monitored to measure the inlet temperature and its output feeds measurements back to a control system to directly control the heater(s). During periods of low load conditions where the inlet temperature is below a setpoint, the control system activates the pre-heaters in order to maintain a minimum inlet temperature. This satisfies the need for the inlet temperature to be above a certain level, thereby ensuring that the temperature is high enough so that when process water is added for promotion of the acid gas reactions with lime the scrubber exit temperature is maintained above the minimum required for proper system operation. The temperature sensor may be a conventional dry bulb temperature sensor 82 or its functional equivalent installed at or near the CFB scrubber inlet. In response to the measurements taken by the control system and using pre-determined temperature control settings, the scrubber control system adjusts the scrubber inlet temperature setpoint in real time to the pre-determined optimum temperature. When it is desired to place the CFB scrubber into service in the absence of flue gas, isolation dampers in the ID Fan outlet duct and in the CFB scrubber inlet duct upstream of the FGR system junction (where FGR recirculation duct connects to the scrubber inlet) are initially fully closed. The ID fan is placed into service to create a minimum acceptable air flow rate using the FGR system. Lime and other byproducts are recycled through the system to create a scrubber bed. The pre-heater(s) are activated until the minimum required scrubber inlet air temperature is achieved, at which point process water is added to allow the desired level of acid gas removal. The isolation dampers are then opened, allowing flue gas from the boiler or other source to enter the CFB scrubber system. The pre-heater control system will then automatically reduce its heat input in response to the measured CFB scrubber inlet temperature.

The invention is equally effective for Spray Dryer Absorbers (SDAs) and Transport Reactor (TR) type dry scrubbers and embodiments suited for this purpose are also described.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE PREFERRED EMBODIMENTS

The present invention is a method and system for automated control of the inlet temperature of a dry or semi-dry scrubber, either circulating fluidized bed (CFB) scrubber, Transport Reactor (TR) or spray dryer absorber (SDA) scrubber. In all cases the scrubber is incorporated in an Air Quality Control System (AQCS) additionally incorporating flue gas recirculation FGR for reducing particulates, SOx, and other acid gas emissions and stack opacity. The system maintains the CFB scrubber inlet temperature within a pre-determined range of acceptable temperatures by automatically pre-heating flue gas recirculated to the inlet of the scrubber during periods of low temperature operation. This is accomplished by supplementing the "traditional" gas recirculation scheme with one or more heaters that are automatically activated during start-up, shut-down and other periods of low temperature operation. The invention increases scrubber performance and prevents excursion of $SO_2$ during periods of reduced load.

Figure 1:
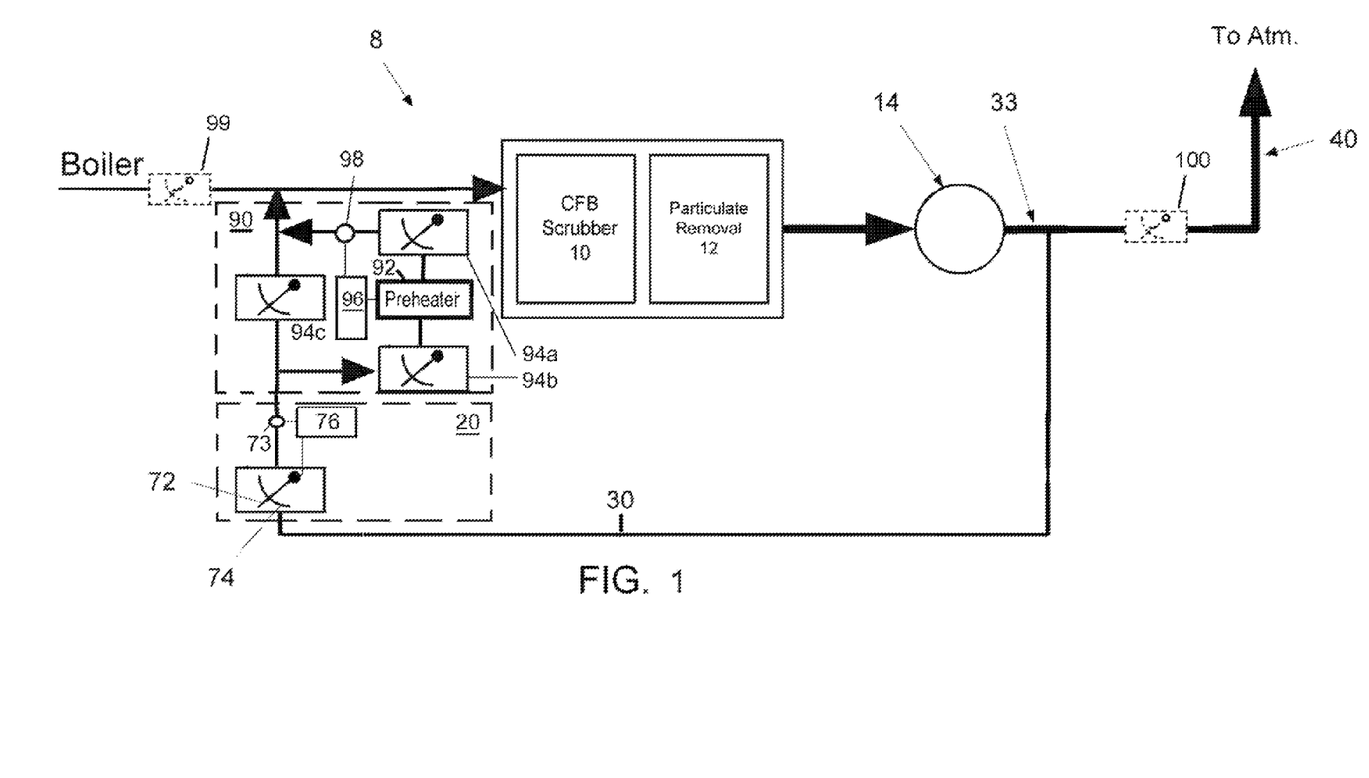
FIG. 1 is a diagram of one embodiment of the present invention incorporated in a CFB scrubber temperature measurement and adjustment feedback loop.

FIG. 1 is a diagram of one embodiment of the present invention incorporated in an AQCS comprising a circulating fluidized bed scrubber (CFB) in combination with a flue gas recirculation FGR loop. Specifically, the AQCS 8 comprises a CFB 10 in which dry lime ($Ca(OH)_2$) is injected into CFB 10 reactor as a dry sorbent. Flue gas from an upstream boiler enters the bottom of the CFB 10 reactor and flows upward past one or more water spray nozzles for cooling water injection. When the flue gas comes in contact with the lime, the lime chemically reacts with $SO_2$, HCl, HF, $SO_3$ and other acids in the flue gas to capture and neutralize these acid gases. The cooling water in the wetted lime evaporates and simultaneously cools the flue gas. The CFB 10 reactor provides the necessary reaction and drying retention time from bottom to top, and then the solids enter a downstream particulate collector 12. The flue gas exits from the CFB 10 and particulate collector 12 through an outlet duct.

An Induced Draft Fan 14 is connected to particulate removal device 12 for exhausting the treated flue gas through a chimney 40 to atmosphere. The Induced Draft (ID) Fan 14 is a high volume fan located downstream of the CFB scrubber 10 and particulate removal device 12, and before the chimney 40. The outlet of the ID Fan 14 is branched to allow flue gas recirculation (FGR). An FGR duct 30 connects the ID Fan outlet duct 33 to the CFB scrubber 10 inlet duct. The FGR duct 30 recirculates a portion of the treated flue gas back into the inlet of the CFB scrubber 10 thereby increasing its volumetric throughput to a level at or above the minimum required to operate the equipment. An FGR flow control device 20 allows the control system to adjust the amount of flue gas being recirculated to meet the minimum gas velocity requirement of the CFB Scrubber 10. FGR flow control device 20 comprises a control damper 72 inline in FGR duct 30. The FGR damper 72 is preferably a louver damper that can be auto-adjusted to any position between fully open and fully closed. FGR damper 72 includes an automatic actuator 74 that is connected to a controller 76 which is in turn connected to a gas flow sensor 73 resident in FGR duct 30. The controller 76 takes measurements from gas flow sensor 73, calculates the amount of gas being recirculated, compares this to a minimum scrubber inlet gas flow rate setpoint, and when needed actuates FGR damper 72 to control the recirculated gas flow. Typically, 20-90% of the flue gas will be re-circulated and the appropriate flow rate is monitored and maintained by the controller 76. One skilled in the art should understand that controller 76 may be tied to, or part of, the boiler central control system or a standalone programmable logic controller PLC. While gas flow sensor 73 is shown positioned in the FGR duct 30 it may alternatively be placed inline in the particulate collector 12 outlet, or at the CFB scrubber 10 inlet or outlet. While FGR flow control device 20 is shown upstream of pre-heater assembly 90 it may be alternatively placed downstream. In accordance with the present invention, a pre-heater assembly 90 is connected inline along a section of the FGR duct 30 proximate the CFB 10 inlet. The pre-heater assembly 90 is comprised of an auto-temperature-controlled preheater 92 flanked by two inline isolation dampers 94a, 94b. The preheater 92 and isolation dampers 94a, 94b are coupled together along a section of bypass duct run parallel to the section of FGR duct 30. In addition, the pre-heater bypass assembly 90 comprises a third isolation damper 94c inline with and selectively interrupting that same section of FGR duct 30. Each of the isolation dampers 94a, 94b, 94c preferably comprise adjustable louver dampers with automatic actuators similar to FGR damper 72 and capable of selectively moving the dampers between fully open and fully closed. The pre-heater assembly 90 may be placed into pre-heat mode by synchronized closure of isolation damper 94c, in combination with synchronized opening of isolation dampers 94a, 94b, which permits the pre-heater assembly 90 to divert up to the entire flow of recirculated gas in duct 30 through the preheat bypass duct and through preheater 92. The preheater 92 preheats the recirculated gas by a modulated amount. The preheat bypass duct rejoins FGR duct 30 proximate the CFB scrubber 10 inlet, thereby preheating the recirculated gas to any desired temperature. Conversely, the pre-heater assembly 90 may be placed into normal mode by synchronized opening of isolation damper 94c, in combination with synchronized closure of isolation dampers 94a, 94b, which permits normal flow through FGR duct 30 and obstructs flow of recirculated gas through the preheat bypass duct or pre-heater 92.

The synchronous operation of isolation dampers 94a-c is controlled by a controller 96 which is in turn connected to a temperature sensor 98 shown positioned in the bypass conduit proximate the CFB scrubber 10 inlet, or alternatively placed inside the CFB scrubber inlet 10 or in the FGR duct 30 immediately prior to the inlet. Temperature sensor 98 is one or more dry bulb temperature sensors, e.g., one or more thermocouples freely exposed to the flue gas but shielded from radiation and moisture, and it/they sense the true thermodynamic temperature of the inlet gas stream. Dry bulb temperature sensor 98 may be a conventional component such as one or more thermocouple(s), resistance temperature detector (RTD) or temperature transmitter. Where significant temperature stratification across the duct is expected multiple sensors 98 may be arranged in a grid array, with the temperatures of the multiple sensors averaged together for pre-heater 92 control. One skilled in the art should understand that pre-heater controller 96 may be tied to, or part of, the boiler central control system, the FGR controller 76, or may be a standalone programmable logic controller PLC as shown.

The pre-heater assembly 90 only modulates flue gas temperature since actuation of the isolation dampers 94a-c does not change the total mass flow rate of flue gas recirculated, but only how much of it is preheated. It is the control damper 72 in FGR duct 30 that regulates the amount of gas flow recirculated. Pre-heater 92 may be electric, steam coil or natural gas fired. The pre-heater 92 may comprise one or more discrete heater modules and one or more heating control circuits for progressively heating the gas in the bypass duct. The amount of heat added by the pre-heater 92 is controlled by temperature controller 96 which monitors the temperature of sensor 98. Depending on the type of pre-heater 92 used, controller 96 may control the number of heater modules energized, the "gate" signal to an SCR controlled electrical heater, the amount of combustion air and fuel fed to a natural gas fired burner system, or the flow rate and pressure of steam fed to a steam fired heater. As the temperature reported by sensor 98 increases above a pre-selected setpoint the amount of heat added is decreased. Conversely, as the temperature reported by sensor 98 decreases below a pre-selected setpoint the amount of heat added is increased. Feed-forward controls based upon the flue gas flow rate or a surrogate signal may also be fed to controller 96.

In effect, by opening the adjustable damper 72, the recirculated flue gas is combined with the incoming flue gas from the boiler to increase the total flow. Given the foregoing, when boiler load decreases, such as upon startup or shut down, the FGR flow control device 20 will activate and the adjustable damper 72 will be opened in proportion to the flow rate sensed at sensor 73 to force more recirculation flow. Independent of flow rate, yet also common during startup, shut down or other periods of low boiler load, the pre-heater bypass assembly 90 will be placed in pre-heat mode (synchronized closure of isolation damper 94c and opening isolation dampers 94a, 94b). The resulting combination of flow control and temperature control allows both flue gas flow rate and temperature entering the AQC system 8 to be maintained at operating levels even when the boiler flue gas flow and temperature alone would be insufficient to keep the CFB Scrubber 10 in service. When temperature rises sufficiently the pre-heater bypass assembly 90 automatically switches to normal mode (synchronized opening of isolation damper 94c and closing of isolation dampers 94a, 94b), and when flow rate rises sufficiently the FGR flow control device 20 proportionately closes damper 72. The control function employed by controller(s) 76, and/or 96 may be a continuous analog function or a series of discrete steps. In the presently-preferred embodiment, the controller 76 processing logic receives the FGR flow rate signal from sensor 73 and adjusts the adjustable damper 72 pursuant to the inlet flue gas flow rate value upstream of the intersection with the FGR 30, if measured, or, if not measured, a flow rate lookup table that correlates inlet gas flow rate to a surrogate signal to maintain the CFB 10 inlet flow rate at its predetermined minimum setpoint. The controller 96 does the same using the dry bulb temperature signal from sensor 98 and adjusts the pre-heater 92 heat input by controlling the number of heater modules energized, the "gate" signal to an SCR controlled electrical heater, the amount of combustion air and fuel fed to a natural gas fired burner system, or the flow rate and pressure of steam fed to a steam fired heater to maintain the CFB 10 inlet temperature at a predetermined minimum setpoint.

In operation, by way of example, between boiler loads of 100% and 60%, the adjustable damper 72 position is 0% open and the FGR flow control device 20 is in normal mode as the boiler flue gas flow and temperature sufficiently maintains the CFB 10 inlet flow rate and temp at a predetermined minimum setpoint (the latter nominally being 240° F. for a typical coal fired boiler application) without use of FGR. As the load drops below 60% and the scrubber inlet temperature drops below 240° F. the adjustable damper 72 is opened to 20% position, introducing 20% preheated recirculated flue gas flow, and the FGR flow control device 20 is in preheat mode to elevate the CFB 10 inlet temperature back to 240° F.

The present invention also encompasses a pre-heater assembly 90 in which the pre-heater 92 is connected inline in series along a section of the FGR duct 30 proximate the CFB 10 inlet, with isolation dampers 94a, 94b and 94c excluded. However, there is an advantage to having the pre-heater in parallel with the main FGR duct 30 because the pre-heater 92 adds pressure drop to the duct which decreases its effectiveness. Also, having the pre-heater 92 exposed to the flue gases even during times when heat is not required would shorten its service life due to corrosion and other factors. Placing the pre-heater 92 in a separate duct in parallel allows purging of the heater area with clean air or gas to prevent corrosion. In the case of multiple AQC systems 8 it is also possible, by placing the FGR duct 30 in a parallel and not serial mode, to place one pre-heater assembly 90 in parallel with the FGR ducts 30 of both AQC systems 8 and to allow sharing of the single pre-heater assembly 90 simply by adding a second set of bypass dampers 94a and 94b.

The above-described AQCS system is premised on an existing incoming flow of flue gas that is not at the right temperature or flow. However, the AQCS system 8 has the capability to be placed completely in service with no boiler flue gas flow at all, instead substituting preheated recirculation flow to satisfy the need for the CFB 10 inlet temperature to be high enough to promote the acid gas reactions with lime in the reactor chamber and avoiding excursions during low-load operation. In situations where there is no incoming flue gas at all, it becomes necessary to add an isolation damper in the duct coming from the boiler at a point upstream of the gas recirculation exit from 90. Also a damper needs to be added downstream of the ID Fan outlet duct 33 and FGR duct 30 junction. The first isolation damper 99 and second isolation damper 100, respectively, are shown in dotted lines. These dampers 99, 100 serve both as flow control and isolation dampers. They remain fully closed without flue gas so that ambient air is recycled through the heater section in a closed loop. This will cause the air to increase in temperature with time and will also establish minimum flow. When this preflow is increased up to the requisite flow setpoint the lime, fuel ash and byproduct can be added into CFB Scrubber 10 to create a fluidized bed. When it is increased up to the temperature setpoint water can be added. This was previously impossible since without the preheating this is impossible (even with isolation dampers 99 and 100). At this point the CFB scrubber 100 is now fully in service and the dampers 99 and 100 can be opened to allow flue entry. The flow control system 20 and temperature control system 90 will then automatically react the flow and temperature of the incoming gas, maintaining both as needed.

The above-described invention is equally well-suited for use in an AQCS comprising a spray dryer absorber (SDA) or Transport Reactor (TR) in combination with a flue gas recirculation FGR loop, and the very same preflow construct with dampers 99, 100 can be used with any of the SDA, TR and CFB scrubbers as described below.

Figure 2:
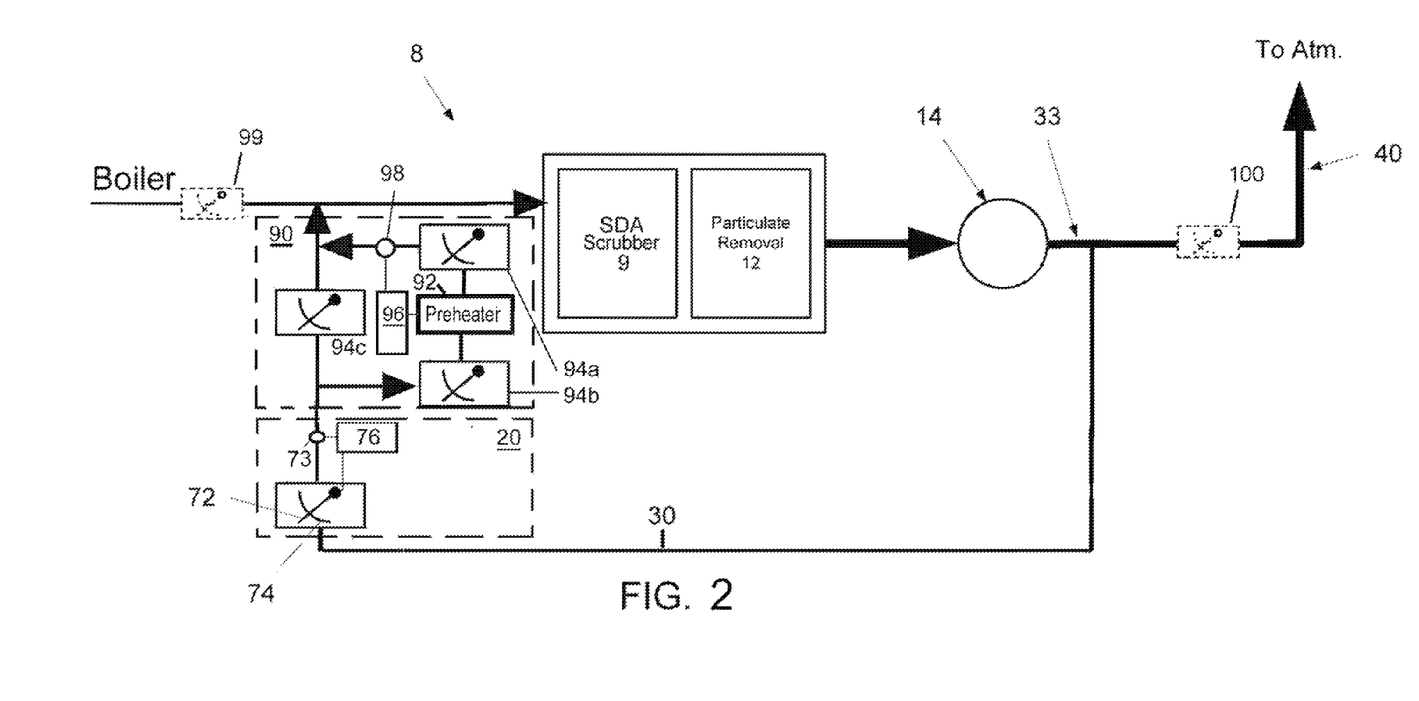
FIG. 2 is a diagram of an alternate embodiment of the present invention incorporated in an SDA scrubber temperature measurement and adjustment feedback loop.

FIG. 2 is a diagram of an alternative embodiment of the invention incorporated in an Air Quality Control System AQCS comprising a spray dryer absorber SDA in combination with a flue gas recirculation FGR loop. In spray dryer absorber SDA 9 flue gas is contacted with an aqueous lime slurry that is sprayed onto the flue gas, SDA 9 being connected to a downstream particulate removal device 12. The SDA scrubber 10 is a well-established dry scrubber used widely for boilers burning a wide range of fuels including coal bituminous, sub-bituminous and PRB, pet coke, peat and biomass. Again, optional dampers 99, 100 (dotted lines) can be used as described above to place the AQCS system completely in service with no boiler flue gas flow at all, instead substituting preheated recirculation flow to satisfy the need for the SDA 9. All other components and operation of the present invention are as described above in regard to FIG. 1.

Figure 3:
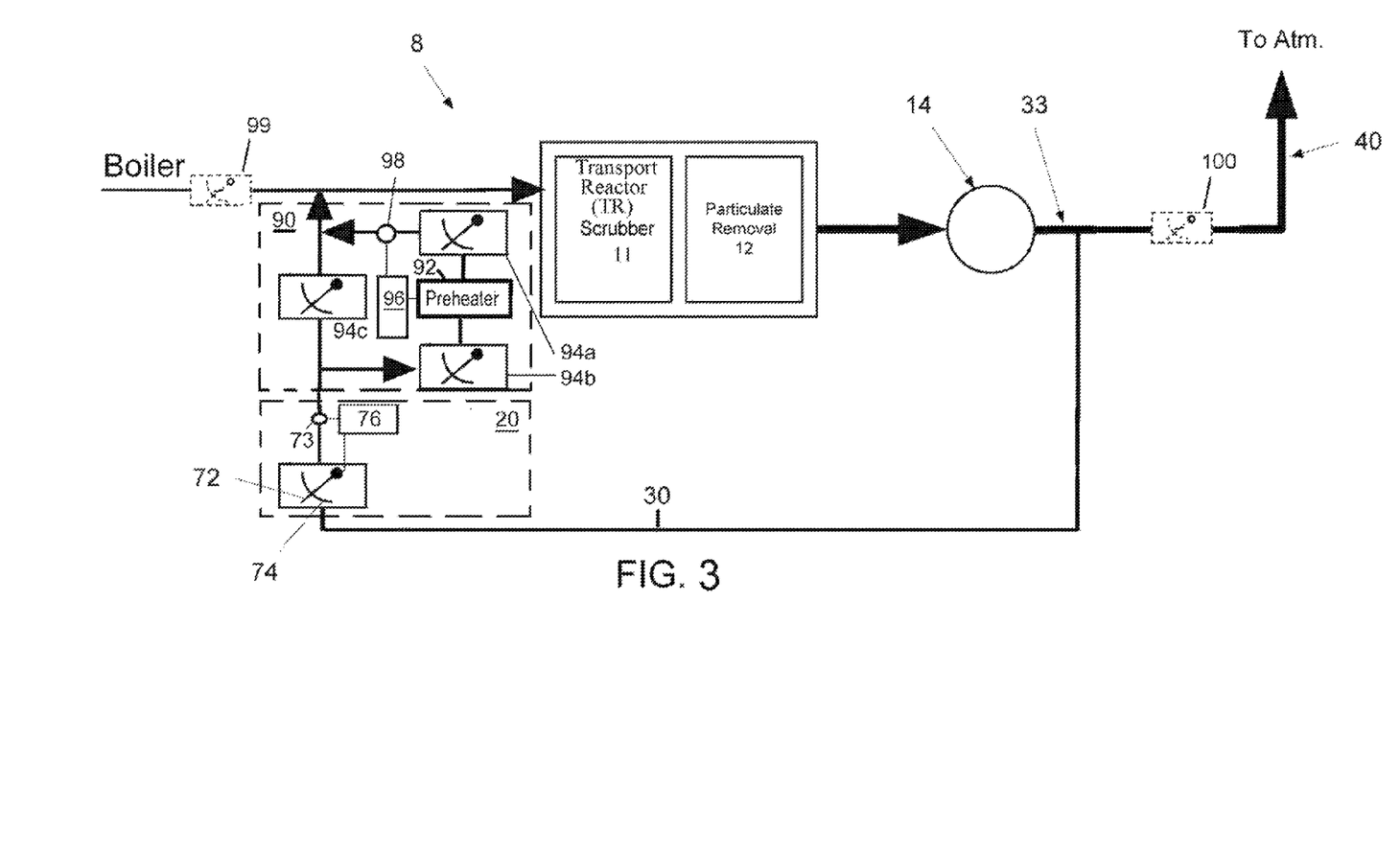
FIG. 3 is a diagram of an alternate embodiment of the present invention incorporated in a TR scrubber temperature measurement and adjustment feedback loop.

FIG. 3 is a diagram of yet another alternative embodiment of the invention incorporated in an Air Quality Control System AQCS comprising a Transport Reactor (TR) 11 in combination with a flue gas recirculation FGR loop. TR 11 is connected to a downstream particulate removal device 12. The TR 11 is a well-established dry scrubber, an example being the Alstom™ Flash Dryer Absorber (FDA) system, also known as the Alstom™ Novel Integrated Desulphurization System (NIDS). All other components and operation of the present invention are as described above in regard to FIGS. 1-2. Again, optional dampers 99, 100 (dotted lines) can be used as described above to place the AQCS system completely in service with no boiler flue gas flow at all, instead substituting preheated recirculation flow to satisfy the need for the TR 11. Note that in the case of the Transport Reactor FIG. 3 indicates an FGR loop around a single TR 11 and particulate removal device 12.

The FGR design as contemplated is also applicable where multiple trains of TR 11 and particulate removal device 12 are in parallel, with an FGR system taking flue gas from a combined gas outlet downstream of the parallel particulate removal devices 12 and injecting the appropriate portion of it upstream of a common inlet upstream of the parallel TR 11 vessels.

It should now be apparent that the method and system of the present invention independently controls the inlet temperature and flow rate of a spray dryer absorber SDA, Transport Reactor TR and/or CFB in an Air Quality Control System AQCS additionally incorporating flue gas recirculation FGR within a pre-determined range of acceptable temperatures by automatically pre-heating flue gas recirculated to the input of the SDA/TR/CFB during periods of low temperature to ensure the total evaporation of the lime slurry or water mixture regardless of system load.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

The invention claimed is:

1. An apparatus for automated inlet temperature control of an air quality control system including any one from among the group consisting of a circulating fluidized bed (CFB) scrubber, Transport Reactor (TR) or spray dryer absorber (SDA) scrubber with an inlet duct and an outlet duct connected to a downstream induced draft (ID) fan, air quality control system also including a flue gas recirculation (FGR)

system comprising a FGR duct connected from the outlet of said ID fan to said inlet duct, said apparatus comprising:
a temperature probe mounted in said inlet duct proximate said CFB scrubber, TR or SDA for sensing temperature of flue gas in said inlet duct just prior to entry into said CFB scrubber, TR or SDA;
a pre-heater connected to said FGR duct and in fluid communication with said CFB scrubber, TR or SDA;
a programmable controller in communication with said temperature probe for monitoring a dry bulb temperature at said probe, said programmable controller including software comprising computer instructions stored on non-transitory computer media for performing the steps of,
comparing a dry bulb temperature sensed by said probe to at least one predetermined minimum temperature setpoint, and
selectively outputting a control signal when the dry bulb temperature is less than said predetermined minimum temperature setpoint.

2. The apparatus for automated inlet temperature control of an air quality control system according to claim 1, wherein said pre-heater is connected in series with said FGR duct.

3. The apparatus for automated inlet temperature control of an air quality control system according to claim 1, wherein said pre-heater is connected in parallel with said FGR duct.

4. The apparatus for automated inlet temperature control of an air quality control system according to claim 1, further comprising a chimney in fluid communication downstream of said ID fan.

5. The apparatus for automated inlet temperature control of an air quality control system according to claim 1, wherein said FGR duct recirculates a portion of treated flue gas back into said inlet to increase volumetric throughput in said CFB scrubber, TR or SDA to above a minimum level required to operate.

6. The apparatus for automated inlet temperature control of an air quality according to claim 5, further comprising an FGR flow control device for controlling that said portion of treated flue gas recirculated back into said inlet to increase volumetric throughput in said CFB scrubber, TR or SDA.

7. The apparatus for automated inlet temperature control of an air quality according to claim 6, wherein said FGR flow control device comprises a control damper positioned inline inside said FGR duct, and actuator, and a gas flow sensor positioned inline inside said FGR duct, said programmable controller being in communication with said gas flow sensor.

8. The apparatus for automated inlet temperature control of an air quality according to claim 7, wherein said control damper is a louver damper that can be auto-adjusted to any position between fully open and fully closed.

9. The apparatus for automated inlet temperature control of an air quality according to claim 8, wherein said programmable controller in communication with said gas flow sensor includes software comprising computer instructions stored on non-transitory computer media for performing the steps of,
calculating a measure of gas being recirculated,
comparing said measure of gas recirculated to a minimum setpoint,
actuating said FGR damper to control the recirculated gas flow in accordance with said comparing step.

10. The apparatus for automated inlet temperature control of an air quality according to claim 7, wherein said louver damper is positioned upstream of said pre-heater.

11. The apparatus for automated inlet temperature control of an air quality according to claim 7, wherein said louver damper is positioned downstream of said pre-heater.

12. The apparatus for automated inlet temperature control of an air quality according to claim 3, wherein said pre-heater is connected in parallel with said FGR duct by a bypass duct, and two inline isolation dampers are positioned in said bypass duct, a first isolation damper located upstream of said pre-heater and a second isolation damper located downstream of said pre-heater.

13. The apparatus for automated inlet temperature control of an air quality according to claim 12, further comprising a third isolation damper located in said FGR duct.

14. The apparatus for automated inlet temperature control of an air quality according to claim 13, wherein said pre-heater may be placed into pre-heat mode by closure of said third isolation damper in combination with opening said first and second isolation dampers.

15. The apparatus for automated inlet temperature control of an air quality according to claim 14, wherein said pre-heater may be placed into normal mode by opening of said third isolation damper in combination with closing said first and second isolation dampers.

16. The apparatus for automated inlet temperature control of an air quality according to claim 12, wherein said temperature probe is positioned in the bypass conduit.

17. The apparatus for automated inlet temperature control of an air quality according to claim 12, wherein said control signal controls said pre-heater to decrease an amount of heat added when said temperature is above said pre-selected setpoint, and increase an amount of heat added when said temperature is below a pre-selected setpoint.

18. In an Air Quality Control System (AQCS) having a scrubber in parallel with a flue gas recirculation (FGR) duct, a system for maintaining an inlet temperature to said scrubber within a pre-determined range of acceptable temperatures by automatically pre-heating flue gas recirculated to the input of the scrubber through said FGR duct, comprising:
at least one probe mounted in an inlet duct proximate said scrubber for sensing the temperature of the flue gas entering said scrubber;
a programmable controller for monitoring dry bulb temperature at said probe(s) and for comparing said sensed temperature to at least one predetermined minimum temperature setpoint and for selectively outputting a control signal in response thereto;
a pre-heater connected to a section of said flue gas recirculation (FGR) duct and in fluid communication with said scrubber;
isolation dampers for selectively passing flue gas through or around said pre-heater and for isolation of the scrubber system from the boiler and stack.

19. The system according to claim 18, wherein said pre-heater is connected in series with said FGR duct.

20. The system according to claim 18, wherein said pre-heater is connected in parallel with said FGR duct.

21. The system according to claim 19, further comprising an FGR flow control device for controlling that said portion of treated flue gas recirculated back into said inlet to increase volumetric throughput in said CFB scrubber, TR or SDA.

22. The system according to claim 21, wherein said FGR flow control device comprises a control damper positioned inline inside said FGR duct, and actuator, and a gas flow sensor positioned inline inside said FGR duct, said programmable controller being in communication with said gas flow sensor.

23. The system according to claim 22, wherein said control damper is a louver damper that can be auto-adjusted to any position between fully open and fully closed.

24. The system according to claim 23, wherein said programmable controller in communication with said gas flow sensor includes software comprising computer instructions stored on non-transitory computer media for performing the steps of,
   calculating a measure of gas being recirculated,
   comparing said measure of gas recirculated to a minimum setpoint,
   actuating said FGR damper to control the recirculated gas flow in accordance with said comparing step.

25. The system according to claim 23, wherein said louver damper is positioned upstream of said pre-heater.

26. The system according to claim 23, wherein said louver damper is positioned downstream of said pre-heater.

27. The system according to claim 19, wherein said pre-heater is connected in parallel with said FGR duct by a bypass duct, and two inline isolation dampers are positioned in said bypass duct, a first isolation damper located upstream of said pre-heater and a second isolation damper located downstream of said pre-heater.

28. The system according to according to claim 27, further comprising a third isolation damper located in said FGR duct.

29. The system according to claim 19, wherein said temperature probe is positioned in the bypass conduit.

30. The system according to claim 19, wherein said control signal controls said pre-heater to decrease an amount of heat added when said temperature is above said pre-selected setpoint, and increase an amount of heat added when said temperature is below a pre-selected setpoint.

* * * * *